(12) United States Patent
Moochikootathil

(10) Patent No.: US 9,608,562 B2
(45) Date of Patent: Mar. 28, 2017

(54) COOLING FIXTURE FOR SOLAR PHOTOVOLTAIC PANELS

(71) Applicant: KING SAUD UNIVERSITY, Riyadh (SA)

(72) Inventor: Zakariya Kaneesamkandi Moochikootathil, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 38 days.

(21) Appl. No.: 14/681,042

(22) Filed: Apr. 7, 2015

(65) Prior Publication Data
US 2016/0301363 A1    Oct. 13, 2016

(51) Int. Cl.
F24J 2/32    (2006.01)
F24J 2/04    (2006.01)
H02S 40/42    (2014.01)

(52) U.S. Cl.
CPC ................. H02S 40/425 (2014.12)

(58) Field of Classification Search
CPC ........ F28F 27/00; F28F 2280/06; F28F 9/001; H01L 31/0521; F24J 2/04; F24J 2002/0405; F24J 2/32
USPC ............................. 165/45, 10, 623; 136/246
See application file for complete search history.

(56) References Cited

U.S. PATENT DOCUMENTS

| | | | |
|---|---|---|---|
| 4,483,321 A | 11/1984 | Sharpe | |
| 5,941,238 A * | 8/1999 | Tracy | F24D 11/0221 126/641 |
| 9,022,021 B2 * | 5/2015 | Mcpheeters | F24J 2/5233 126/621 |
| 2005/0044862 A1 * | 3/2005 | Vetrovec et al. | B01D 5/0066 62/93 |
| 2008/0087275 A1 | 4/2008 | Sade et al. | |
| 2011/0253190 A1 | 10/2011 | Farnham, Jr. | |
| 2011/0272367 A1 * | 11/2011 | Kufner | F24J 2/5232 211/41.1 |
| 2012/0031468 A1 * | 2/2012 | Boise et al. | F24J 2/10 136/248 |
| 2014/0007919 A1 | 1/2014 | Brottier et al. | |
| 2014/0060620 A1 | 3/2014 | Placer | |

(Continued)

FOREIGN PATENT DOCUMENTS

KR    10-2011-014738    2/2011

OTHER PUBLICATIONS http://www.seia.org/research-resources/solar-heating-cooling-technology (Last Accessed on Apr. 1, 015) 6 pgs.

*Primary Examiner* — Allana Lewin Bidder
*Assistant Examiner* — Harry Arant
(74) *Attorney, Agent, or Firm* — Richard C. Litman

(57) ABSTRACT

The cooling fixture for solar photovoltaic panels has a hollow support platform made from thermally conductive metal that contains a heat exchange medium, preferably water. The solar photovoltaic panel is supported atop the platform so that heat absorbed by the panel is transferred to the platform by conduction and through the media by convection. The platform is pivotally supported on a base frame, and can be adjusted to any desired angle by a brace releasably engaging lugs projecting from the edge of the platform. The heat exchange medium is circulated from the top of the platform to the bottom of the platform by a thermo-siphon effect through at least one thin, rectangular duct having at least one fin for cooling the medium by heat exchange with air.

18 Claims, 4 Drawing Sheets

(56) References Cited

U.S. PATENT DOCUMENTS

2014/0158650 A1  6/2014  Krantz et al.

* cited by examiner

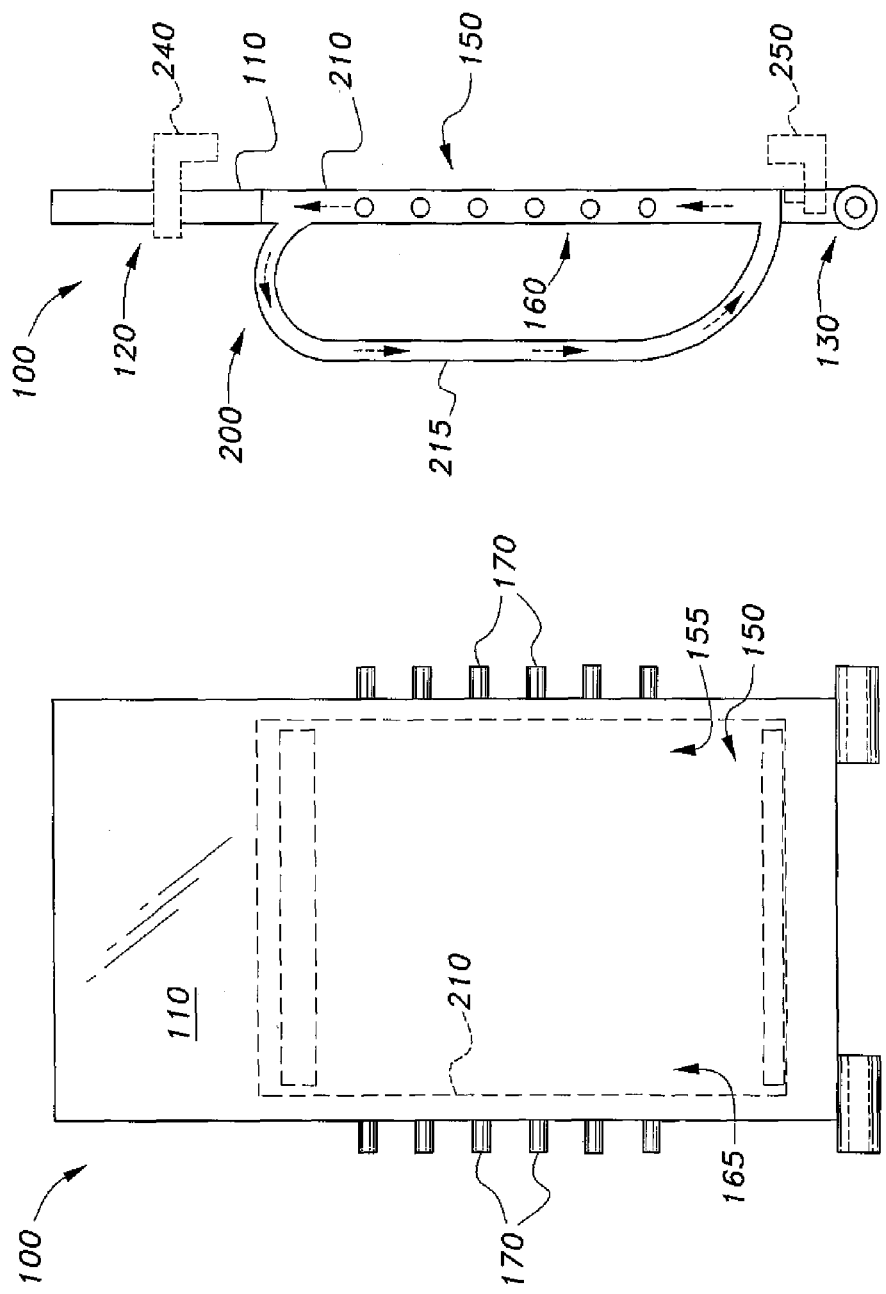

COOLING FIXTURE FOR SOLAR PHOTOVOLTAIC PANELS

BACKGROUND OF THE INVENTION

1. Field of the Invention

The present invention generally relates to photovoltaic solar panel installations, and more particularly, to a cooling fixture for solar photovoltaic panels.

2. Description of the Related Art

Power generation from solar photovoltaic panels ("solar panels") is a type of clean sustainable energy, since photovoltaic cells draw solar energy from the sun and convert the solar radiation into electricity. The direct conversion of solar radiation to electricity typically occurs without any moving parts or environmental emissions. The efficiency of photovoltaic cells, however, is influenced by the operating temperature. For example, once the temperature of the photovoltaic cells reaches 75° C., the efficiency of photovoltaic cells, in terms of electrical output, can be reduced by 50%.

Not all wavelengths of the solar radiation are converted into electricity. Only solar radiation having wavelengths within a certain range can be converted into electricity, while the solar radiation having wavelengths outside of this range is typically converted into heat, which is absorbed by the solar panel. This heat, in combination with the ambient temperature, can significantly increase the temperature of the photovoltaic cells and the solar panel(s). As the temperature of the solar panels increases, the amount of electricity produced typically decreases, thereby increasing the cost per watt of electricity. This undesirable effect typically becomes more pronounced in regions where solar radiation and surrounding ambient temperature are high.

The normal operating cell temperature of most of the commercial solar panels is around 48° C. Solar panels located in cold temperature regions typically do not require cooling mechanisms, since the increase in temperature is not normally an issue. However, in many other regions of the world, the average ambient temperature can range between 30° C. to 40° C., which can result in solar panel temperatures between 50° C. to 60° C. Moreover, during the summer months the average ambient temperature in these regions can reach between 40° C. and 50° C., resulting in even hotter solar panels. In some regions of the world, such as the Middle East, and especially in the summer months, e.g., in July and August, the temperature of solar panels can reach a temperature of about 72° C.; thereby significantly reducing the electricity output from these solar panels and increasing the cost per watt of electricity.

While a variety of methods, including active or passive cooling, utilizing phase change material, evaporative cooling, and utilizing fins or heat sinks to coupled the solar panels, have been proposed, none has proven entirely satisfactory, and solar panel manufacturers continue to supply solar panels without cooling mechanisms.

Thus, a cooling fixture for solar photovoltaic panels solving the aforementioned problems is desired.

SUMMARY OF THE INVENTION

The cooling fixture for solar photovoltaic panels has a hollow support platform made from thermally conductive metal that contains a heat exchange medium, preferably water. The solar photovoltaic panel is supported atop the platform so that heat absorbed by the panel is transferred to the platform by conduction and through the media by convection. The platform is pivotally supported on a base frame, and can be adjusted to any desired angle by a brace releasably engaging lugs projecting from the edge of the platform. The heat exchange medium is circulated from the top of the platform to the bottom of the platform by a thermo-siphon effect through at least one thin, rectangular duct having at least one fin for cooling the medium by heat exchange with air.

These and other features of the present invention will become readily apparent upon further review of the following specification and drawings.

BRIEF DESCRIPTION OF THE DRAWINGS

FIG. 4 is a front view of the cooling fixture for solar photovoltaic panels of FIG. 1.

FIG. 5 is a side view of the cooling fixture for solar photovoltaic panels of FIG. 1, the base frame being omitted.

Similar reference characters denote corresponding features consistently throughout the attached drawings.

DETAILED DESCRIPTION OF THE PREFERRED EMBODIMENTS

Figure 1:
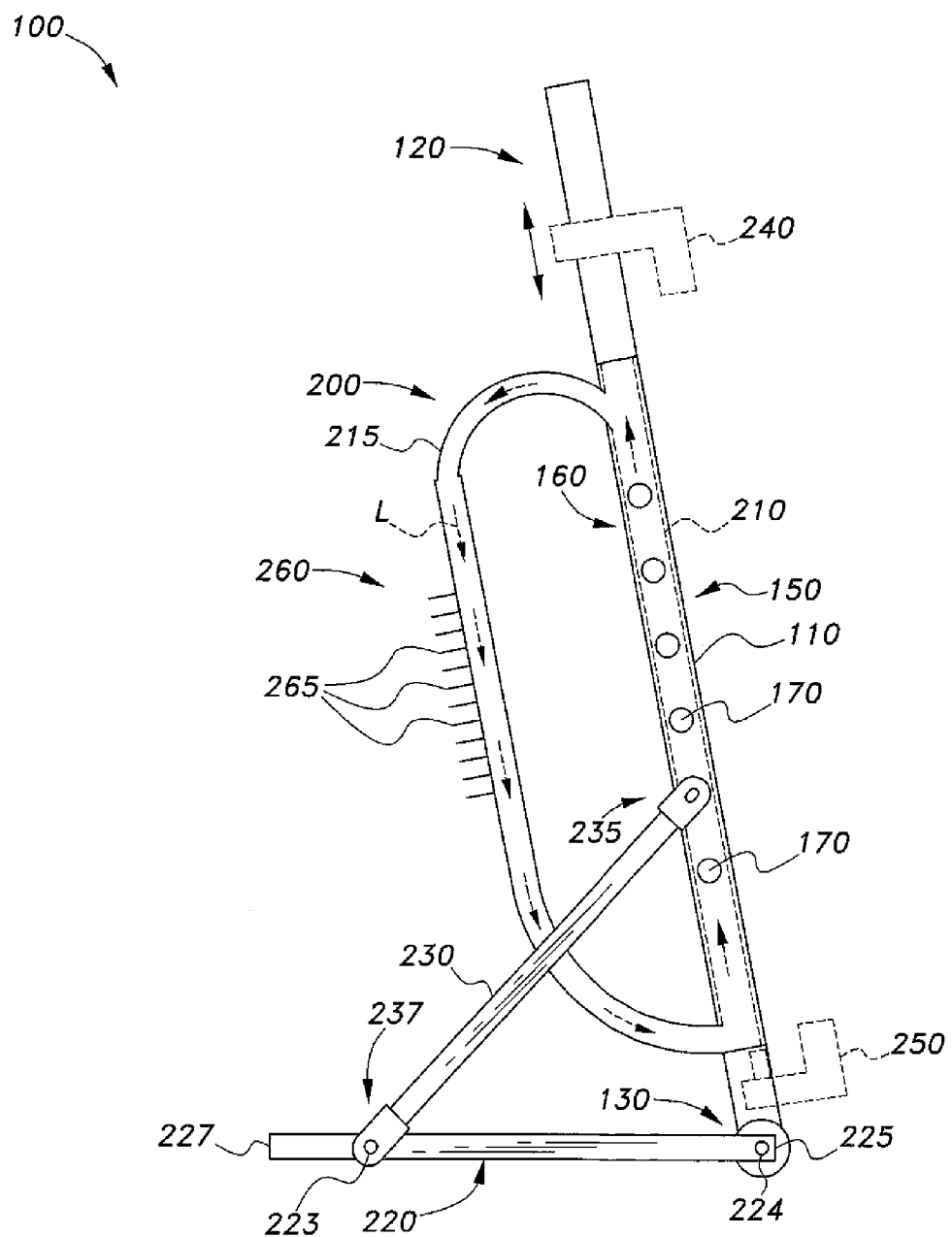
FIG. 1 is a side view of a cooling fixture for solar photovoltaic panels according to the present invention having arrows showing the direction of circulation of a heat exchange medium (preferably water) through the fixture.
Figure 2:
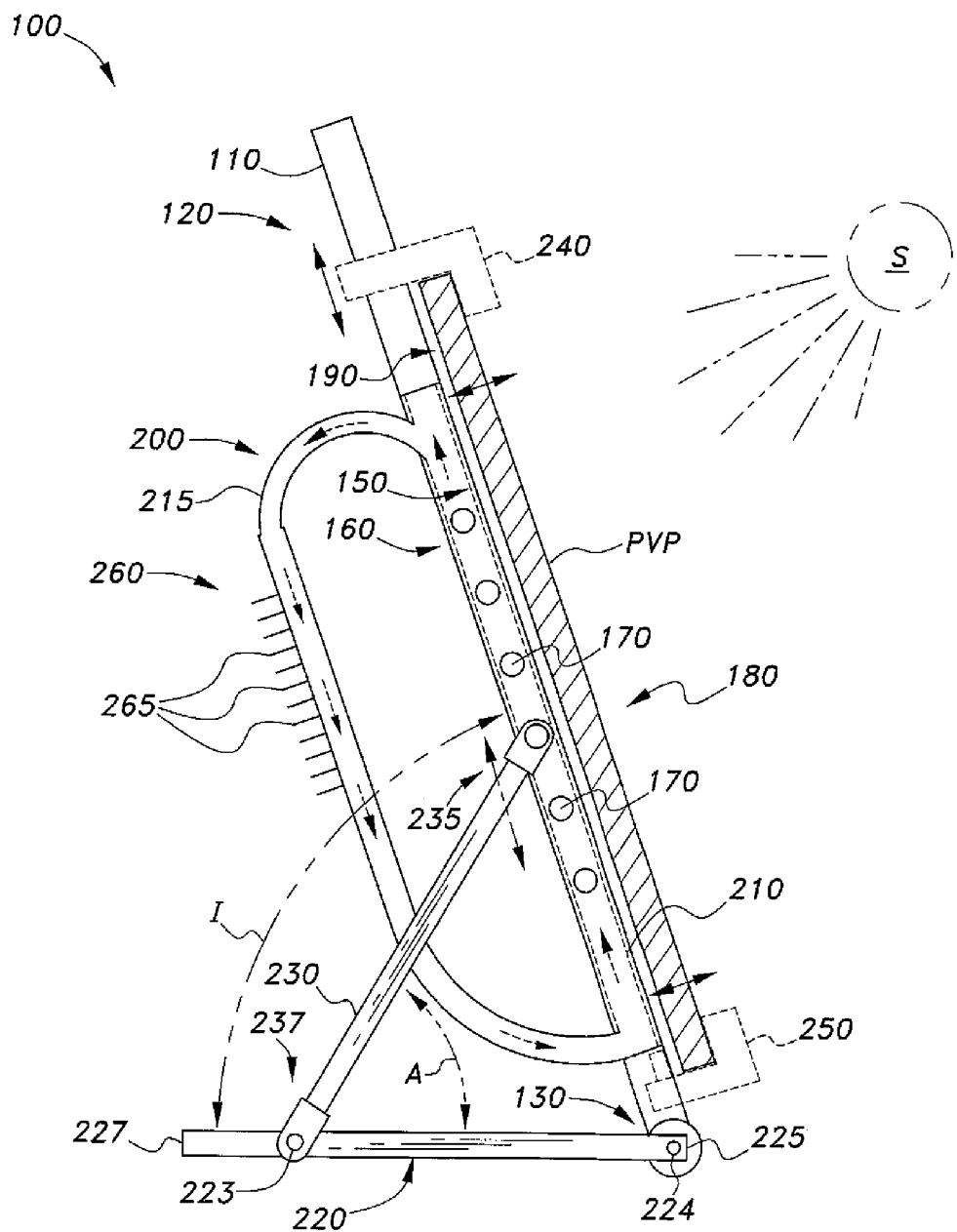
FIG. 2 is an environmental side view of the cooling fixture for solar photovoltaic panels of FIG. 1.
Figure 3:
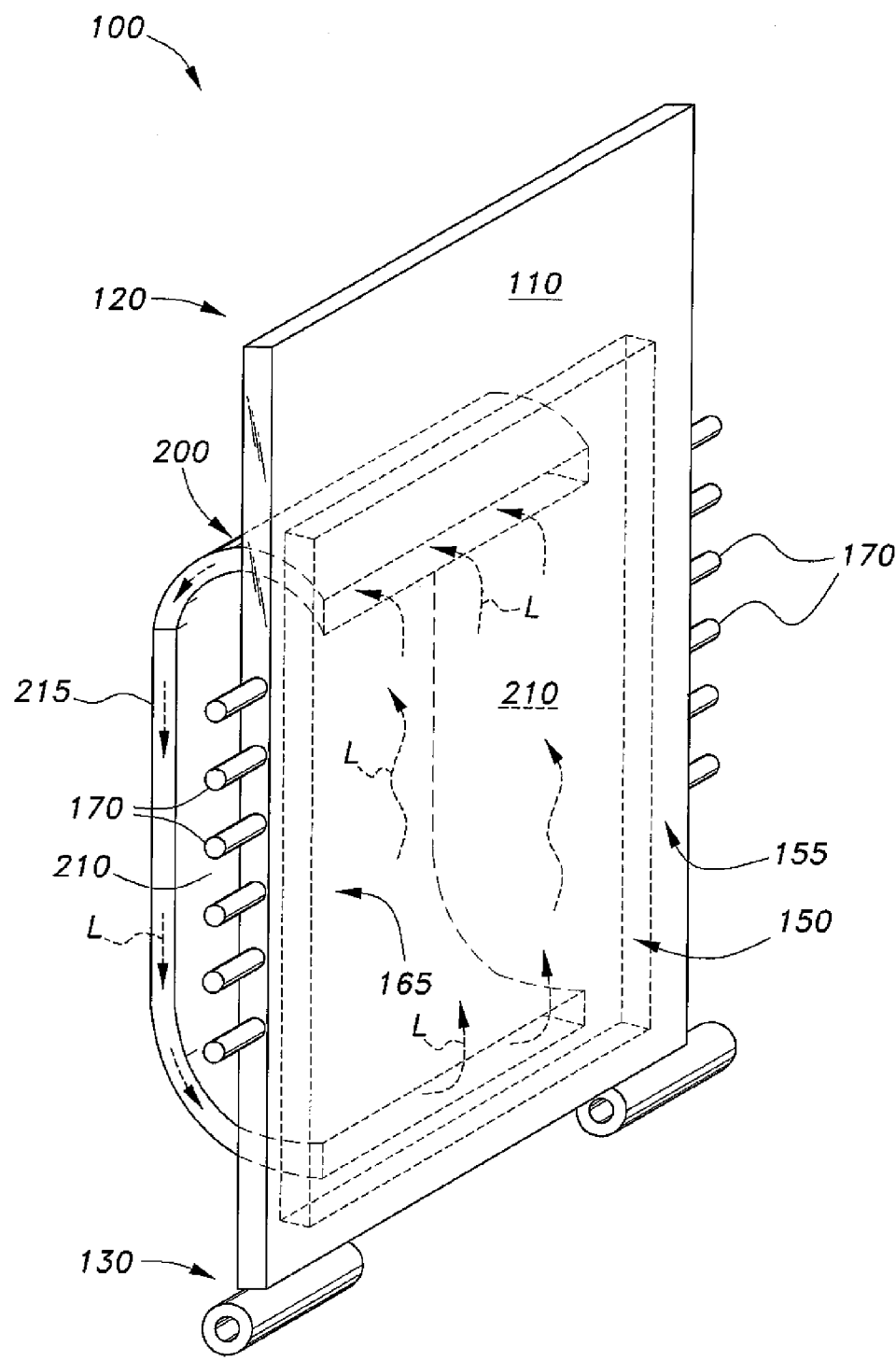
FIG. 3 is a perspective view of the cooling fixture for solar photovoltaic panels of FIG. 1.

Referring to FIGS. 1-5, the cooling fixture 100 for solar photovoltaic panels is configured for holding, supporting, and angularly adjusting a solar photovoltaic panel PVP having a front portion 180 including an array of photovoltaic cells and a back portion 190 (FIG. 2). The fixture 100 has a hollow support platform 110 made from a thermally conductive metal that is filled with a heat exchange medium, preferably water. The platform 110 may be made from copper, bronze, aluminum, or other thermally conductive metal. Thermal contact between the photovoltaic panel and the platform 110 can be improved by using thermally conducting pastes or by using metal powder. The solar photovoltaic panel PVP is supported on the support platform 110 so that all, or a substantial portion, of the back portion of the panel PVP is in contact with the surface area of the support platform 110. Heat generated or absorbed by the solar photovoltaic panel is transferred by conduction through the front wall 150 of the support platform 110 to the heat exchange medium L contained in the chamber 210 defined by the platform 110.

A cooling system for the support platform, the cooling system defined by a closed loop having a substantially D-shape. The fixture 100 includes a heat exchange structure 200 extending from the rear wall 160 of the support platform 110. The heat exchange structure 200 includes at least one duct 215 connected between the top portion 120 of the platform and the bottom portion 130 of the platform 110. The duct 215 may comprise a plurality of thin rectangular tubes, or may comprise a single thin rectangular jacket. The duct 215 has a plurality of heat exchange fins 265 extending from a central portion 265 thereof. As shown by the arrows in FIGS. 1 and 2, the heated heat exchange medium L is drawn upward in the platform 110 to the top portion 120 and into the duct 215 by thermo-siphon action, circulates through the duct 215 where heat is exchanged with the air through the fins 265, and after being cooled, returns to the hollow platform 110 through the bottom portion 130, thereby cooling the solar photovoltaic panel PVP. The duct having a first end extending from and attached to the rear wall adjacent the bottom wall, a second wall end extending from and attached to rear wall near the top wall, and a middle portion extending from the first end and the second end, the middle portion having an exterior surface facing the support platform such that a space extends between the middle portion and the rear wall of the support platform. The heat exchange medium L is preferably water, but antifreeze or other heat exchange media may be used. The duct 215 and/or the fins 265 may also be made from a thermally conductive metal, as described above.

The support platform 110 is pivotally attached to a frame so that the angle A of the platform 110 and the solar photovoltaic panel PVP supported thereon can be adjusted for maximum exposure to the sun S. For example, the support platform 110 may have one or more cylindrical feet or rollers extending therefrom. A base frame 220, which may be spaced apart legs 227 or a plate having spaced apart front projecting members 225, may be pivotally attached to the feet or rollers by a pivot pin 224. A brace 230, or left and right braces 230, may have a lower end 237 pivotally attached to the side or top of the legs 227 by a pivot pin 223, and an upper end 235 attached to one of a plurality of spaced apart lugs 170 extending from the right side 155 and/or left side 165 of the platform 110. The brace 230 may be secured to the pivot pin 223 and the lug 170 by a cotter pin, clevis pin, snap ring, or other suitable fastener, as known in the art.

The solar photovoltaic panel PVP may be retained on the support platform 110 by at least one L-shaped top bracket 240 and at least one L-shaped bottom bracket 250 extending from the front wall 150 of the platform 110. The support platform 110 may have any desired dimensions, a length of 1400 mm and a width of 750 mm being exemplary, that may be necessary to support the solar photovoltaic panel PVP.

It is to be understood that the present invention is not limited to the embodiments described above, but encompasses any and all embodiments within the scope of the following claims.

I claim:

1. A fixture for supporting solar photovoltaic panels, comprising:
    a support platform formed of a thermally conductive material, the support platform having a front wall, a rear wall, a top wall, a bottom wall, a left side wall, and a right side wall, the front wall of the support platform being designed and configured to provide support for at least one solar photovoltaic panel;
    a cooling system for the support platform, the cooling system defined by a closed loop having a substantially D-shape, the closed loop consisting of:
        an interior chamber portion defined between the front, rear, top, bottom, left and right walls;
        wherein the interior chamber portion is hollow;
        a duct having a first end extending from and attached to the rear wall adjacent the bottom wall, a second end extending from and attached to the rear wall near the top wall, and a middle portion extending from the first end and the second end, the middle portion having an exterior surface facing the support platform such that a space extends between the middle portion and the rear wall of the support platform the duct being in fluid communication with the interior chamber portion of the support platform;
    a heat exchange medium disposed in the closed loop of the interior chamber portion and the duct, the heat exchange medium is selected from the group consisting of water and antifreeze;
        wherein the heat exchange medium flows within the loop from the first end of the duct into the interior chamber portion adjacent the bottom wall, upwardly towards the top wall and into the second end of the duct, from the second end of the duct downwardly to the first end of the duct; and
    a plurality of fins coupled to and extending from the middle portion of the duct between the first and second ends;
    a plurality of pairs of lugs attached to the support platform, each pair of the plurality of pairs of lugs respectively extending from the right and left walls of the support platform, the plurality of pairs of lugs being equidistantly spaced along the right and left side walls;
    wherein each lug of each pair of the plurality of pairs of lugs is designed and configured as a substantially cylindrically shaped member extending normally from one of the right and left side walls, in a direction opposite the interior chamber portion;
    a base frame having a pivotal connection, the support platform being coupled to the base frame by the pivotal connection; and
    at least one brace pivotally attached to the base frame;
    wherein the at least one brace is attachable to the support platform by at least one lug of a pair of lugs in order to adjustably position the support the support platform at an adjustable angle.

2. The fixture for supporting solar photovoltaic panels according to claim 1, wherein the fins are designed and configured to cool the heat exchange medium within the duct.

3. The fixture for supporting solar photovoltaic panels according to claim 1, further comprising a plurality of brackets extending from the front wall of the support platform, the brackets being adapted for securing the at least one solar photovoltaic panel to the support platform;
    wherein the support platform and each of the at least one solar photovoltaic panel being in thermal communication therebetween.

4. The fixture for supporting solar photovoltaic panels according to claim 1, wherein the plurality of brackets including at least one top bracket and at least one bottom bracket.

5. The fixture for supporting solar photovoltaic panels according to claim 1, wherein the support platform is made from a metal selected from the group consisting of copper, bronze, and aluminum.

6. The fixture for supporting solar photovoltaic panels according to claim 1, wherein the duct is made from a metal selected from the group consisting of copper, bronze, and aluminum.

7. The fixture for supporting solar photovoltaic panels according to claim 1, wherein the pivotal connection of the support frame is disposed at an end of the base, each one of the at least one brace having one end pivotally attached to the base opposite the pivotal connection.

8. The fixture for supporting solar photovoltaic panels according to claim 1, wherein the fins allow adjacent ambient air to cool the heat exchange medium flowing from the second end of the duct to the first end.

9. In combination, a support structure and a solar electricity generator, the combination comprising:
    a base frame including at least one brace, and at least one pivotal connector;

a support frame having a bottom wall pivotally secured to the base frame, a top wall, left and right walls, front and rear walls, the walls defining a hollow interior having a upper end and a lower end;

a plurality of lugs extending outwardly from each of the left and right walls, the plurality of lugs be spaced apart equidistantly along each of the right and left walls;

wherein each lug is designed and configured as a substantially cylindrically shaped member extending normally from one of the right and left side walls, opposite the hollow interior;

the at least one brace pivotally attached to the base frame at one end, and selectively attached to at least one lug of the plurality of lugs;

wherein the at least one brace selectively positions the support frame at an adjustable angle with the base frame about the at least one pivotal connector;

wherein the hollow interior and the duct form a closed fluid loop having a configuration that is substantially D-shaped the closed loop consisting of:

the hollow interior;

a duct having a first end extending from and attached to the rear wall adjacent the bottom wall, a second wall end extending from and attached to rear wall near the top wall, and a middle portion extending from the first end and the second end, the middle portion having an exterior surface facing the support frame such that a space extends between the middle portion and the rear wall of the support frame, the duct being in fluid communication with the hollow interior of the support frame.

a plurality of fins extending from the duct the middle portion of;

and a heat exchange medium disposed within the closed fluid loop;

wherein the heat exchange medium circulates from the lower end to the upper end of the hollow interior, from the second end to the first end of the duct in the closed loop;

wherein the plurality of fins dissipate heat from the heat exchange medium to ambient air adjacent thereto; and at least one solar photovoltaic panel selectively secured to the front wall of the support frame;

wherein at least the front wall of the support frame is formed of a heat conductive material, and each at least one solar photovoltaic panel is secured adjacent and in thermal contact with the front wall of the support frame, the heat exchange medium dissipates heat from the each at least one solar photovoltaic panel through the front wall of the support frame.

10. The combination according to claim 9, further comprising a plurality of brackets extending from the front wall of the support platform, the brackets being adapted for securing the solar photovoltaic panel to the support platform.

11. The combination according to claim 10, wherein the plurality of brackets including at least one top bracket adjacent the top wall, and at least one bottom bracket adjacent the bottom wall.

12. The combination according to claim 9, wherein the front wall of the support platform is made from a metal selected from the group consisting of copper, bronze, and aluminum.

13. The combination according to claim 12, wherein the support platform is made from a metal selected from the group consisting of copper, bronze, and aluminum.

14. The combination according to claim 13, wherein the at least one duct is made from a metal selected from the group consisting of copper, bronze, and aluminum.

15. The combination according to claim 9, wherein the heat exchange medium is selected from the group consisting of water and antifreeze.

16. The combination according to claim 9, further comprising at least one top bracket adjacent the top wall, and extending from the front wall of the support platform, and at least one bottom bracket adjacent the bottom wall, extending from the front wall of the support platform;

wherein the top and bottom brackets selectively secure the at least one solar photovoltaic panel to the support platform, so that heat generated by the at least one solar photovoltaic panel is dissipated through the front wall of the support platform.

17. A method for supporting and cooling at least one solar photovoltaic panel, the method comprising the steps of:

securing the at least one solar photovoltaic panel on a front side of before a support platform made from thermally conductive metal, the support platform having the front wall, a rear wall, a top wall, a bottom wall, a left side wall, and a right side wall, the support platform defining a hollow interior;

providing a cooling system for the support platform, the cooling system defined by a closed loop having a substantially D-shape, the closed loop consisting of:

the hollow interior;

an-air cooled duct having a first end extending from and attached to the rear wall adjacent the bottom wall, a second wall end extending from and attached to rear wall near the top wall, and a middle portion extending from the first end and the second end, the middle portion having an exterior surface facing the support platform such that a space extends between the middle portion and the rear wall of the support platform, the duct being in fluid communication with the hollow interior of the support platform; and a plurality of fins couple to an extending from the middle portion of the air-cooled duct between the first and second ends;

providing a heat exchange medium within the hollow interior, whereby heat is transferred from each at least one solar photovoltaic panel to the heat exchange medium by conduction and convection;

providing the air-cooled duct externally disposed about the support platform and in a closed fluid communication with the hollow interior; and circulating the heat exchange medium from a top portion of the platform to a bottom portion of the platform through the air-cooled duct by thermo-siphon action, whereby the heat exchange medium is cooled and returned to the bottom portion of the platform.

18. The method according to claim 17, wherein the heat exchange medium is water.

* * * * *